(12) United States Patent
Schricker et al.

(10) Patent No.: US 12,013,301 B2
(45) Date of Patent: Jun. 18, 2024

(54) MEASURING SYSTEM AND METHOD FOR DETERMINING A FORCE AND/OR A TORQUE ON A TORQUE-TRANSMITTING SHAFT

(71) Applicants: AVL LIST GMBH, Graz (AT); PIEZOCRYST ADVANCED SENSORICS GMBH, Graz (AT)

(72) Inventors: Alexander Schricker, Graz (AT); Franz Dreisiebner, Graz (AT); Helmut Kokal, Graz (AT); Mario Propst, Obdach (AT); Michael Hirschler, Graz (AT)

(73) Assignees: AVL List GmbH, Graz (AT); PIEZOCRYST ADVANCED SENSORICS GMBH, Graz (AT)

( * ) Notice: Subject to any disclaimer, the term of this patent is extended or adjusted under 35 U.S.C. 154(b) by 166 days.

(21) Appl. No.: 16/964,478

(22) PCT Filed: Jan. 24, 2019

(86) PCT No.: PCT/AT2019/060027
§ 371 (c)(1),
(2) Date: Jan. 14, 2021

(87) PCT Pub. No.: WO2019/144171
PCT Pub. Date: Aug. 1, 2019

(65) Prior Publication Data
US 2021/0190609 A1    Jun. 24, 2021

(30) Foreign Application Priority Data

Jan. 24, 2018    (AT) ............................. A 50064/2018

(51) Int. Cl.
*G01L 1/16*    (2006.01)
*G01L 3/10*    (2006.01)
(Continued)

(52) U.S. Cl.
CPC .............. *G01L 5/0019* (2013.01); *G01L 1/16* (2013.01); *G01L 3/108* (2013.01); *G01L 3/1457* (2013.01);
(Continued)

(58) Field of Classification Search
CPC ... G01L 3/108; G01L 1/16; G01L 3/10; G01L 3/02–12; G01L 5/167; G01L 3/107; G05D 17/02
See application file for complete search history.

(56) References Cited

U.S. PATENT DOCUMENTS 3,566,163 A * 2/1971 Fischer ..................... G01L 1/16
310/329
3,614,488 A * 10/1971 Sonderegger ...... B23Q 17/0966
310/333
(Continued)

FOREIGN PATENT DOCUMENTS

CN    1505750    6/2004
CN    101535789    9/2009
(Continued)

OTHER PUBLICATIONS

Official Action for Austria Patent Application No. A 50064/2018, dated Aug. 17, 2018, 4 pages.
(Continued)

*Primary Examiner* — Tran M. Tran
(74) *Attorney, Agent, or Firm* — Sheridan Ross P.C.

(57) ABSTRACT

The invention relates to a measuring system for determining a force and/or a torque on a torque-transmitting shaft, wherein: the measuring system has at least three, in particular at least four, piezoelectric elements each having a preferred direction and each being arranged at different positions about a rotational axis of the shaft in a force flow transmitted via the shaft, said arrangement being such that a
(Continued)

Figure 1:
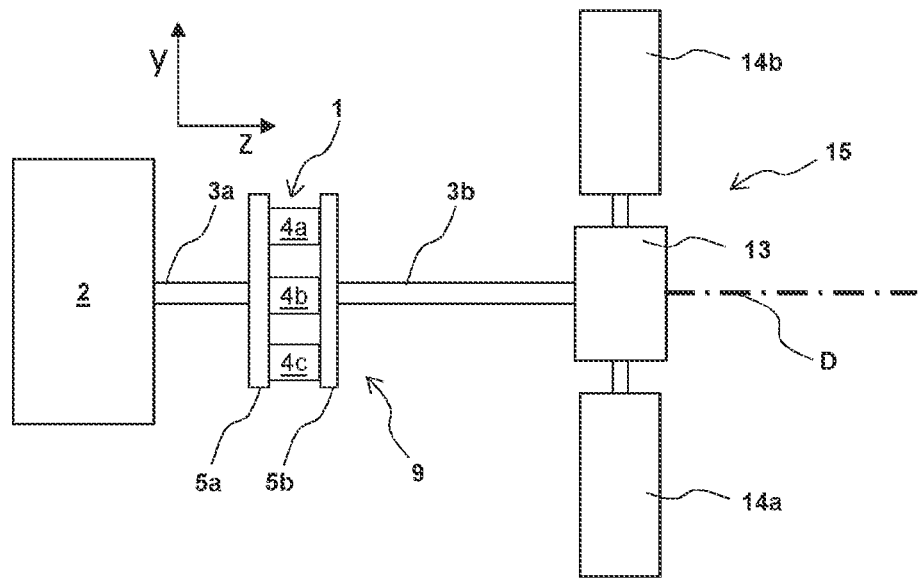

force of the force flow acts, in particular exclusively, on the piezoelectric elements; the preferred directions each lie parallel to or in a single plane which is intersected by the rotational axis; and the preferred directions of at least two, in particular at least three, of the piezoelectric elements are oriented neither parallel nor antiparallel to one other.

21 Claims, 8 Drawing Sheets

(51) Int. Cl.
  *G01L 3/14*  (2006.01)
  *G01L 5/00*  (2006.01)
  *G01L 5/162*  (2020.01)
  *G01L 5/167*  (2020.01)

(52) U.S. Cl.
  CPC .......... *G01L 3/1464* (2013.01); *G01L 5/0042* (2013.01); *G01L 5/162* (2013.01); *G01L 5/167* (2013.01)

(56) References Cited

U.S. PATENT DOCUMENTS

| | | | | |
|---|---|---|---|---|
| 3,640,130 | A * | 2/1972 | Spescha | G01L 5/167 73/862.043 |
| RE29,755 | E * | 9/1978 | Perkins | H01G 7/025 310/329 |
| 4,148,530 | A * | 4/1979 | Calderara | G01L 9/008 310/361 |
| 4,178,799 | A * | 12/1979 | Schmieder | G01L 5/226 73/862.045 |
| 4,186,596 | A * | 2/1980 | Bohringer | G01L 3/108 73/862.338 |
| 4,635,769 | A | 1/1987 | de Hertel Eastcott | |
| 4,666,315 | A * | 5/1987 | Scranton | F16C 32/06 384/1 |
| 4,741,231 | A * | 5/1988 | Patterson | B23Q 17/0966 73/104 |
| 4,759,217 | A | 7/1988 | Brihier et al. | |
| 4,802,371 | A * | 2/1989 | Calderara | G01L 1/16 73/862.68 |
| 4,830,399 | A * | 5/1989 | Hafner | G01L 1/20 280/5.52 |
| 4,875,365 | A * | 10/1989 | Powell | B23Q 17/0957 73/104 |
| 4,884,461 | A * | 12/1989 | Sawicki | G01L 1/2231 73/104 |
| 4,974,454 | A * | 12/1990 | Wolfer | A61B 5/1036 73/862.541 |
| 4,984,173 | A | 1/1991 | Imam et al. | |
| 5,027,663 | A * | 7/1991 | Frister | G01L 3/1435 73/862.331 |
| 5,154,084 | A * | 10/1992 | Sonderegger | G01L 1/16 73/761 |
| 5,168,758 | A * | 12/1992 | Wolfer | B23Q 17/0966 73/862.541 |
| 5,297,430 | A * | 3/1994 | Sonderegger | G01L 5/243 73/862.68 |
| 5,329,823 | A * | 7/1994 | Sonderegger | G01L 5/167 73/862.642 |
| 5,513,536 | A * | 5/1996 | Reger | G01L 5/162 73/847 |
| 5,677,487 | A * | 10/1997 | Hansen | G01L 5/167 310/329 |
| 5,677,488 | A * | 10/1997 | Monahan | F16C 19/527 73/660 |
| 5,821,431 | A * | 10/1998 | Durand | G01L 5/16 73/862.043 |
| 6,279,395 | B1 * | 8/2001 | Insalaco | G01P 15/0915 310/329 |
| 6,532,830 | B1 * | 3/2003 | Jansen | G01L 5/1627 73/862.042 |
| 7,059,202 | B2 * | 6/2006 | Stanos | G01L 5/0033 73/862.043 |
| 7,469,593 | B2 * | 12/2008 | Zumberge | G01L 1/16 73/777 |
| 8,015,886 | B2 * | 9/2011 | Lohr | G01L 3/1428 73/862.326 |
| 8,042,413 | B2 * | 10/2011 | Schaffner | G01L 5/0076 73/862.68 |
| 8,113,058 | B2 * | 2/2012 | Baumgartner | G01L 9/008 361/283.1 |
| 8,662,754 | B1 | 3/2014 | Frederick | |
| 8,720,024 | B2 * | 5/2014 | Ting | H01L 41/0833 29/25.35 |
| 8,854,054 | B2 * | 10/2014 | Ludwig | G01L 3/106 324/658 |
| 9,239,270 | B2 * | 1/2016 | Ting | G01L 3/10 |
| 9,347,839 | B2 * | 5/2016 | Kohler | G01L 5/167 |
| 9,816,886 | B2 * | 11/2017 | Inazumi | G01L 1/16 |
| 10,151,650 | B2 * | 12/2018 | Buckley | G01L 5/225 |
| 10,254,183 | B2 * | 4/2019 | Kohler | G01L 5/167 |
| 10,677,667 | B2 * | 6/2020 | Cavalloni | G01L 1/16 |
| 11,022,509 | B2 * | 6/2021 | Cavalloni | G01P 15/09 |
| 11,209,325 | B2 * | 12/2021 | Cavalloni | G01L 1/165 |
| 11,268,866 | B2 * | 3/2022 | Adachi | G01L 5/0028 |
| 2005/0103556 | A1 | 5/2005 | Peterson et al. | |
| 2006/0070461 | A1 | 4/2006 | Delair et al. | |
| 2015/0276513 | A1 * | 10/2015 | Kawai | G01L 5/167 901/46 |
| 2016/0109311 | A1 * | 4/2016 | Inazumi | G01L 5/226 73/862.042 |
| 2017/0370789 | A1 | 12/2017 | Klopf et al. | |
| 2018/0149530 | A1 * | 5/2018 | Yamamura | B25J 13/085 |
| 2019/0242768 | A1 * | 8/2019 | Sonderegger | G01L 5/167 |
| 2019/0263634 | A1 | 8/2019 | Cheng et al. | |
| 2019/0368954 | A1 | 12/2019 | Atkins et al. | |

FOREIGN PATENT DOCUMENTS

| | | |
|---|---|---|
| CN | 101606050 | 12/2009 |
| CN | 103196594 | 7/2013 |
| CN | 106908333 | 6/2017 |
| DE | 1952522 | 11/1970 |
| DE | 3019751 | 12/1981 |
| DE | 19936293 | 2/2001 |
| DE | 10304359 | 11/2003 |
| DE | 102009014284 | 10/2010 |
| DE | 102010024806 | 12/2011 |
| EP | 0266452 | 5/1988 |
| EP | 0342253 | 11/1989 |
| EP | 0459069 | 12/1991 |
| JP | 2000-105171 | 4/2000 |
| JP | 2003-279425 | 10/2003 |
| JP | 2006-322771 | 11/2006 |
| JP | 2007-212314 | 8/2007 |
| JP | 2011-257202 | 12/2011 |
| JP | 2015-166706 | 9/2015 |

OTHER PUBLICATIONS

International Search Report and Written Opinion for International (PCT) Patent Application No. PCT/AT2019/060027, dated Jun. 6, 2019, 20 pages.
Translated International Search Report for International (PCT) Patent Application No. PCT/AT2019/060027, dated Jun. 6, 2019, 3 pages.
Official Action with machine translation for China Patent Application No. 201980021684.4, dated Oct. 19, 2021, 14 pages.
Official Action with English Translation for Japan Patent Application No. 2020-540633, dated Jul. 4, 2022, 4 pages.
U.S. Appl. No. 16/964,484, filed Jul. 23, 2020, Schricker et al.
Translated International Search Report for International (PCT) Patent Application No. PCT/AT2019/060028, dated Jun. 17, 2019, 3 pages.
Official Action with machine translation for China Patent Application No. 201980021621.9, dated Oct. 26, 2021, 13 pages.

(56) References Cited

OTHER PUBLICATIONS

Official Action with English Translation for Japan Patent Application No. 2020-540548, dated Aug. 22, 2022, 4 pages.
Official Action with Machine Translation for European Patent Application No. 19705906.6, dated Apr. 13, 2023, 8 pages.
Official Action for U.S. Appl. No. 16/964,484, dated Apr. 18, 2023 9 pages.
Official Action for European Patent Application No. 19705905.8, dated Aug. 22, 2023, 14 pages.
Official Action with English Summary for Korea Patent Application No. 10-2020-7024179, dated Jul. 20, 2023, 11 pages.
Notice of Allowance for U.S. Appl. No. 16/964,484, dated Aug. 7, 2023 7 pages.

* cited by examiner

MEASURING SYSTEM AND METHOD FOR DETERMINING A FORCE AND/OR A TORQUE ON A TORQUE-TRANSMITTING SHAFT

CROSS REFERENCE TO RELATED APPLICATIONS

This application is a national stage application under 35 U.S.C. 371 and claims the benefit of PCT Application No. PCT/AT2019/060027 having an international filing date of 24 Jan. 2019, which designated the United States, which PCT application claimed the benefit of Austria Patent Application No. A50064/2018 filed 24 Jan. 2018, the disclosures of each of which are incorporated herein by reference in their entireties.

The invention relates to a measuring system for determining a force and/or a torque on a torque-transmitting shaft, wherein the measuring system comprises at least three, in particular at least four, piezoelements, each having a preferred direction which are each arranged at different positions about a rotational axis of the shaft in a force flow transmitted via the shaft such that a force of the force flow acts, in particular exclusively, on the piezoelements.

In the development and regulation of motors, in particular internal combustion engines or electrical machines, it is important to have the most accurate knowledge possible about the torque on the shaft of the motor, in particular in test bench operation.

Employing measuring devices having strain gauges or piezoelectric sensors to that end is known from the prior art.

Strain gauges and similar measuring elements generally serve in measuring static forces. Generally speaking, however, measuring systems with measuring elements of this type have a reaction time which is too long for measuring dynamic force paths. In contrast, piezoelectric measuring elements, or piezoelements respectively, are suited to measuring dynamic tensile, compressive and shear forces. They have a broad dynamic range, are rigid, and can also measure highly dynamic forces with concurrently high resolution.

Document EP 0 266 452 A1 relates to a piezoelectric transducer for measuring force and torque which consists of at least two piezoelements as well as at least one carrier plate made of insulating material arranged between them, wherein the piezoelements are crystallographically preorientated with respect to the coordinate system of the carrier plate and fixedly connected to same.

The DE 195 25 22 A1 document relates to a force and torque measuring arrangement consisting of a plurality of force-measuring cells and amplifier arrangements, characterized in that the plurality of force-measuring cells are tightly screwed to a measuring unit between mounting plates and arranged with respect to coordinate axes such that torque formation is possible, whereby the signals from the force-measuring cells are routed to a group of amplifiers for evaluation and their outputs are in turn routed to a group of operational amplifiers, as a result of which both the individual force components as well as the moments of force can be measured.

Document DE 10 2009 014284 B4 relates to a torque sensor consisting of a first and a second disc-shaped fastening flange which are disposed axially opposite one another in parallel and connected together rigidly by a radially inward torque transmission element, wherein the second fastening flange is designed as a measuring flange exhibiting a plurality of recesses and shear force transducers separated from each other by radial stiffening webs on a coaxial circumferential region between its radially outer fastening area and the coaxially inward torque transmission element, wherein the recesses are formed by at least three measuring pockets which are axially open on one side, wherein the base area of the measuring pockets is formed as a flat closed surface representing a uniformly thin, spring-elastic deformation body and the shear force transducers are applied on the base surfaces or the axially opposed outer surfaces of the measuring pockets.

It is a task of the invention to provide improved determination of an applied torque or an applied force on a torque-transmitting shaft. In particular, it is a task of the invention to provide an easily calibrated measuring system.

This task is solved by a measuring system for determining a force and/or a torque, a method for determining a torque applied to a torque-transmitting shaft and/or a force acting on a shaft, and a method for calibrating a measuring system in accordance with the independent claims. Advantageous embodiments are claimed in the subclaims.

A first aspect of the invention relates to a measuring system for determining a force and/or torque on a torque-transmitting shaft, wherein the measuring system comprises at least three, in particular at least four, piezoelements, each having a preferred direction, which are each arranged at different positions about a rotational axis of the shaft in a force flow transmitted via the shaft such that a force of the force flow acts, in particular exclusively, on the piezoelements, wherein the preferred directions each lie parallel to or in a single plane intersected by the rotational axis, and wherein the preferred directions of at least two, in particular at least three, of the piezoelements are oriented neither parallel nor antiparallel to one another. Given two parallel or antiparallel preferred directions, the two preferred directions are preferably oriented perpendicular to each other.

The features and advantages described below with respect to the first aspect of the invention also apply to the further aspects of the invention and vice versa.

A force flow in the sense of the invention is a path of a force and/or torque in a mechanical system from a point of application, in particular a point of introduction, to one point or multiple points at which force and/or torque is taken up by a reactive force and/or reactive torque. Preferably, the force flow is composed of a force, in particular a force transverse to the shaft's rotational direction, and a torque, in particular about the rotational axis.

A power flow in the sense of the invention is a path of power transmission in a mechanical system from a point of introduction to one point or multiple points at which the power drops off.

A fixing device in the sense of the invention serves preferably in bearing, in particular fixing, the piezoelements. Further preferably, the fixing device connects the individual piezoelements, whereby they are held in a relative position to one another. Preferably, the fixing device is an adapter plate, a ring element, a measuring flange or even a mounting bracket. Further preferably, the fixing device can be a component of an existing apparatus, for example a housing, a gearbox or a machine.

A piezoelement in the sense of the invention is preferably a measuring element configured to measure a force acting over two areas adjacent the piezoelement. Preferably, a piezoelement consists of the piezoelectric crystal as well as a charge dissipator or electrical circuit respectively.

A measuring system in the sense of the invention is preferably a piezoelectric sensor. In this case, the measuring system serves as the housing of the piezoelements.

Alternatively, however, the measuring system can also comprise individual piezoelectric sensors, whereby the piezoelements are arranged in a separate housing.

A machine in the sense of the invention is configured to convert energy, preferably kinetic energy, in particular a rotation, into electrical energy or vice versa, or chemical energy into kinetic energy. A machine within the meaning of the invention preferably exhibits a housing.

A bearing apparatus in the sense of the invention is preferably an apparatus for rotatably supporting a shaft, in particular a roller bearing, ball bearing or slide bearing. Preferably, a bearing apparatus also exhibits a housing. The bearing apparatus itself is preferably also in turn itself supported or mounted. Further preferably, the bearing apparatus according to the invention is a machine or part of a machine.

A supporting apparatus in the sense of the invention is preferably an apparatus for supporting an element against a force and/or a torque acting on said element. A supporting apparatus is to that end preferably configured to provide a so-called reactive force or bearing reaction force respectively. A supporting apparatus within the meaning of the invention serves preferably in supporting the bearing apparatus. Preferably, the supporting apparatus is a bell housing, a drivetrain housing or a base plate.

The term "mountable" within the meaning of the invention means "able to be mounted" or "being mounted."

The term "connectable" within the meaning of the invention means "able to be connected" or "being connected."

The term "introducible" within the meaning of the invention means "able to be introduced" or "being introduced." Preferably, this thereby refers to the transmitting of a force from one body to another body.

The term "supportable" within the meaning of the invention means "able to be supported" or "being supported."

The term "guidable through" within the meaning of the invention means "able to be guided through" or "being guided through."

The term "loadable" within the meaning of the invention means "able to be loaded" or "being loaded."

The term "arrangeable" within the meaning of the invention means "able to be arranged" or "being arranged."

The invention is based in particular on the approach of determining forces and/or torques acting on a torque-transmitting shaft via a system of equations for force components and torque components based on measurement signals of the individual measuring elements.

To that end, the preferred directions of at least three piezoelements must each lie parallel to or in a plane intersected by a rotational axis of the shaft. Preferably, this plane is oriented approximately perpendicular to the shaft's rotational axis. Furthermore, the preferred directions of the three piezoelements must be oriented such that different force components are measured at different points. Therefore, at least two, preferably three, preferred directions are not to be oriented parallel or antiparallel to one another.

The cited arrangement allows the measurement signals of at least two piezoelements to be separated into linearly independent components. In particular, any force and any torque in the plane acting on the shaft can be determined by way of the measurement signals from piezoelements arranged as such.

With the measuring system according to the invention, all the piezoelements can be employed in determining the force or the torque by taking into account the contribution of individual piezoelements to different force components and torque components.

This avoids the need for respectively different piezoelements or piezoelement groups when determining different directions of force and/or torque. This is advantageous since piezoelements which do not contribute to the measurement of a force component or the torque represent a force shunt with respect to these force components or torque which distorts the measurement result. In the inventive measuring system, a force shunt results at most from fixing means used to fix the piezoelements.

Those portions of a piezoelement's measurement signals which do not contribute to the respectively considered force component or torque are not taken into account according to the invention. A paired arrangement of piezoelements having antiparallel preferred directions to cancel out unwanted portions of the measurement signals is therefore not necessary with the inventive measurement system.

Preferably, the measuring system is thereby configured to measure forces acting both tangential to the shaft's rotational direction, which contribute to the torque, as well as transverse forces, which act perpendicular to the shaft's rotational direction, particularly in two orthogonal directions in the plane, and which can contribute to wobbling of the shaft.

Preferably, any number of piezoelements can also be inventively used to determine the individual directions of the force or the torque. Measurement accuracy can thereby be significantly increased.

Using piezoelements in the measuring enables the registering of highly dynamic changes in force or torque respectively.

Should more than three piezoelements be used for the measurement, measurement accuracy can be increased even more. The same applies when more than two preferred directions of the piezoelements are oriented neither parallel nor antiparallel to each other.

In one advantageous embodiment of the measuring system according to the invention, in particular having more than three piezoelements, the piezoelements are geometrically arranged such that there is no mirror axis and/or point of symmetry in terms of their respective position relative one another in a projection onto the plane.

The inventive measuring system in particular enables arrangements of piezoelements not needing to be arranged in mirror-inverted pairs. The asymmetry of the piezoelement arrangement enables a particularly exact determination of the force or the torque.

Preferably, the preferred direction of at least one piezoelement is not tangential to a direction of rotation of the shaft.

In a further advantageous embodiment of the measuring system, the piezoelements are geometrically arranged such that at least two piezoelements have a different radial distance from the rotational axis and/or that two circular sectors around the rotational axis between two respective piezoelements span a different angle.

This, too, ensures a high degree of asymmetry to the arrangement of the piezoelements and thus increases the measurement accuracy.

In a further advantageous embodiment, the inventive measuring system further comprises a signal processing device which is configured to determine the force and/or torque on the shaft by means of decomposition, in particular orthogonal decomposition, of the respective preferred direction of the piezoelements or the forces to be measured by the individual piezoelements in at least two components, whereby respective parallel components are added together. Preferably, a first component is thereby at least substantially tangential to the shaft's direction of rotation and a second component is preferably at least substantially perpendicular to the direction of rotation.

Decomposition of the preferred direction or the forces enables a plurality of piezoelement measurement signals to be taken into account, each of which contributes to the measurement signal or respectively to the force in a defined direction.

Even if the system of equations solution for three piezoelements arranged pursuant to the invention is unique, the more piezoelements taken into account in the equation system, the more exact of a system resolution can be achieved. Preferably, the force components and/or the torque are to that end calculated from combinations of three respective measurement signals and then averaged across the number of combinations.

The decomposition of the measurement signal into components of the preferred direction or the force moreover has the advantage of not needing to know the exact installation scenario of the piezoelements with respect to the preferred direction of the individual piezoelements. Nor does the arrangement of the piezoelements with respect to the shaft, in particular their radial distance, need to be known. Both parameters can in this case be determined by calibration measurements.

Preferably, measurement signals from all the piezoelements having a respective preferred direction lying parallel to or in the plane are used to determine the force and/or the torque. This thereby prevents portions of the force flow from being lost through a force shunt of a sensor not involved in the measurement.

In a further advantageous embodiment of the inventive measuring system, the plane is oriented at least substantially perpendicular to a rotational axis of the shaft.

Due to this orientation of the plane and the associated orientation of the preferred directions of the piezoelements, a particularly high resolution of the measurement in terms of the torque and forces transverse to the rotational direction can be realized. If the plane is not perpendicular to the rotational axis, measurement signals are only taken into account on a proportional basis to determine the transverse forces and the torque. The portions thereby correspond in each case to the projection of the preferred direction of the respective piezoelement on a fictitious plane which is normal or respectively perpendicular to the rotational axis.

In a further advantageous embodiment of the inventive measuring system, an area of the piezoelements over which the force is introduced lies at least substantially parallel to the plane. As a result, there can be a particularly good introduction of shear forces into the piezoelement.

In a further advantageous embodiment of the inventive measuring system, the piezoelements form a main direct force relative to the force flow, and a force shunt, in particular on fixing means, takes in less than 10%, preferentially less than 5%, and most preferentially less than 2% of the force of the force flow. This thereby enables a particularly precise determination of the force and/or the torque.

In a further advantageous embodiment of the inventive measuring system, a further piezoelement with a preferred direction not oriented parallel to the plane, in particular at least substantially perpendicular to the plane, is arranged adjacent each piezoelement in the direction of the shaft's rotational axis, whereby the piezoelements form pairs with the respective adjacently arranged further piezoelement, wherein the force of the force flow acts in particular substantially on the pairs.

By providing these further piezoelements, not only can a two-dimensional measurement be made of components in the plane but all of the force components can be measured in three dimensions. This is particularly useful when compressive or tensile forces are also to be determined in the direction of the shaft's rotational axis. Due to the particularly advantageous paired arrangement with those piezoelements having a preferred direction arranged parallel to or in the plane, a force shunt is kept as minimal as possible or even completely prevented here as well.

In a further advantageous embodiment, the measuring system comprises a fixing device, in particular a bearing cage, whereby the fixing device supports the piezoelements and positions them relative to each other.

By providing such a fixing device, the measuring system can be utilized as a closed unit in which the individual piezoelements have a fixed position relative to one another. In particular, such a measuring system can be precalibrated, whereby the orientation of the individual preferred directions of the piezoelements and the position of the individual piezoelements are predefined in a reference system of the fixing device. Further preferably, the piezoelements are at least 50%, preferentially at least 70%, even more preferentially at least 90% accommodated in a depression, in particular a blind hole, on the fixing device.

In a further advantageous embodiment of the inventive measuring system, the piezoelements are unevenly distributed about the rotational axis. This thereby enables realizing measurement arrangements in which torque cannot be determined at all circumferential points around the rotational axis for structural reasons.

In a further advantageous embodiment, all the piezoelements and/or pairs within a defined circular sector about the rotational axis are arranged at an angle $\alpha<300°$, preferentially $\alpha<240°$, further preferentially $\alpha<180°$, most preferentially $\alpha<120°$, wherein a fixing device is preferably designed so as to cover this angular sector.

In a further advantageous embodiment of the inventive measuring system, the shaft is supported by a bearing apparatus, in particular a machine, the output and/or input shaft of which is formed by the torque-transmitting shaft, whereby a fixing device supports the piezoelements and/or pairs and is designed such that a force, in particular a shear force, is measurable between the bearing apparatus and a supporting apparatus for supporting the bearing apparatus via the piezoelements.

This embodiment does away with the need for forces and/or torques acting on the torque-transmitting shaft to be measured directly on said shaft.

In particular, there is no need to arrange for a measuring apparatus which is screwed or otherwise attached to the torque-transmitting shaft, as is for example described in the initially cited DE 2009 014 284 B4. On the contrary, this embodiment measures those forces acting as reactive forces on a bearing apparatus of the shaft and the force exerted by the shaft, or the torque acting on the shaft respectively, is deduced from said forces. In other words, the forces are inventively measured at a point in the force flow other than on the torque-transmitting shaft, yet outside of the power flow, and the torque acting on the torque-transmitting shaft is determined, in particular calculated, from said forces.

Due to the strength and rigidity of the piezoelements employed as measuring elements, the bearing apparatus can for one thing be preferably completely supported or mounted by means of the piezoelements. Preferably the full load or full force flow respectively is thus on the piezoelements in this embodiment as well—secondary force flows can at the least be ignored.

In this embodiment, the measuring system does not distort the measurement result since the measuring system is not a component of the rotating shaft. In particular, there is no altering of the moving mass or rotating mass respectively of a torque-transmitting system to be measured, in particular a system to be tested on the test bench. Nor does the measuring apparatus add any elasticities to the torque-transmitting system which would act as vibration dampers or would influence, in particular distort, the natural frequencies of the torque-transmitting system. This is in particular an advantage of the piezoelements compared to systems with strain gauges as measuring elements which, due to their design, are relatively flexible compared to piezoelements and thus influence the system under testing.

The embodiment further enables analyzing the movement of the torque-transmitting shaft and identifying discontinuities and vibrations in the shaft's motion. In particular, a wobbling of the shaft can be identified and measured. This is not possible, or is only possible with difficulty, with a measuring system such as a measuring flange arranged on the shaft. In particular, there is no guarantee that such a measuring flange will be located at that point on the shaft which actually wobbles. The invention is also able to determine the forces which the torque-transmitting shaft exerts on its bearing apparatus and/or a machine, in particular a motor. Such forces cannot be measured with a measuring flange and cannot be determined, or at least not precisely, from the available measurements.

The configuration can thus determine dynamic torque applied to the shaft as well as vertical and horizontal vibrations in the shaft.

In a further advantageous embodiment, the fixing device is further designed such that the force can be introduced parallel to end faces of the piezoelements and/or pairs via a non-positive connection.

This embodiment provides the possibility of using a piezoelectric shear element as the piezoelement. In particular, a single piezoelement can thereby measure forces in two opposite directions without the need for a bonded connection to be established between the end faces of the piezoelements and the respective force-introducing elements.

Preferably, the piezoelements can be frictionally connected to the fixing device and/or bearing apparatus and/or supporting apparatus. Further preferably, the fixing device is further designed such that a force can be measured at least substantially tangential to the direction of rotation and/or parallel to the rotational axis of the shaft.

In a further advantageous embodiment of the inventive measuring system, the piezoelements each exhibit a cavity, in particular a hollow cylinder, through which a respective fixing device, in particular a tensioning screw, can be guided.

In a further advantageous embodiment of the inventive measuring system, the fixing device also exhibits cavities which are at least partially aligned with the cavity of the piezoelectric sensor and in which the tensioning screw can be seated.

By cavities being provided in the piezoelements and/or the fixing device, in particular a pretensioning or respectively preloading can be applied to the piezoelements by means of the fixing devices, whereby a non-positive connection can be established between their end faces and a further element.

A second aspect of the invention relates to a test bench or a vehicle having a measuring system according to the first aspect of the invention.

A third aspect of the invention relates to a measuring arrangement for determining a force and/or a torque on a torque-transmitting shaft which comprises a measuring system based on the piezoelectric effect and a shaft, wherein the piezoelements are arranged between a first part of the shaft and a second part of the shaft such that a force, in particular a shear force, can be measured between the first part and the second part by means of the piezoelements.

In one advantageous embodiment of the measuring arrangement, the shaft consists of two sections able to be connected via a coupling device, whereby the measuring system determines the force and/or torque on one of the two sections.

A fourth aspect of the invention relates to a measuring arrangement for determining a force and/or a torque on a torque-transmitting shaft which comprises a measuring system based on the piezoelectric effect, a shaft, a bearing apparatus and a supporting apparatus of the bearing apparatus, wherein the bearing apparatus supports the shaft, and wherein the measuring system does not alter a rotating mass of the shaft and/or a rotating mass of rotating parts of an aggregate consisting of the shaft and the bearing apparatus. Preferably, a measuring system is thereby used via which the reactive forces of a bearing of the shaft can be measured.

Preferably, the bearing apparatus is thereby a machine, in particular a dynamometer and/or prime mover, preferably an electrical machine or internal combustion engine.

A fifth aspect of the invention relates to a method for determining a torque applied to a shaft and/or a force applied to a shaft, wherein the force and/or torque on the shaft is determined by means of orthogonal decomposition of the respective preferred directions of the piezoelements or the respective forces measured by the individual piezoelements, whereby respective parallel components are added together.

In one advantageous embodiment, the method comprises the following procedural steps:
    detecting at least one first signal of a first piezoelectric sensor, one second signal of a second piezoelectric sensor, and one third signal of a third piezoelectric sensor;
    proportionately totaling the signals in at least one direction corresponding to a respective component of the preferred direction of the piezoelements in said direction; and
    deriving the torque and/or force from the summed signals; or
    proportionately deriving the torque and/or force for each individual signal in at least one direction corresponding to a respective component of the preferred direction of the piezoelements in said direction; and
    totaling the torques and/or forces.

A sixth aspect of the invention relates to a method for calibrating a measuring system comprising the following procedural steps:
    applying a defined force in a first direction parallel to the plane;
    applying a defined force in a second direction parallel to the plane;
    detecting at least one first signal of a first piezoelectric sensor, one second signal of a second piezoelectric sensor, and one third signal of a third piezoelectric sensor; and deriving preferred directions of the piezoelements on the basis of the detected signals and first and second direction of the defined forces.

A seventh aspect of the invention relates to a method for calibrating a measuring system comprising the following procedural steps:
  applying a defined torque about the rotational axis of the shaft;
  detecting at least one first signal of a first piezoelectric sensor, one second signal of a second piezoelectric sensor, and one third signal of a third piezoelectric sensor; and
  deriving distances of the piezoelements, in particular in relation to the rotational axis of the shaft of the piezoelements, on the basis of the detected signals and the defined torque.

Further aspects of the invention relate to a computer program which is configured to, when run on a computer, prompt the latter to execute the steps of a method according to the invention, as well as a corresponding computer-readable medium. The inventive methods can thus be computer-supported.

Figure 2:
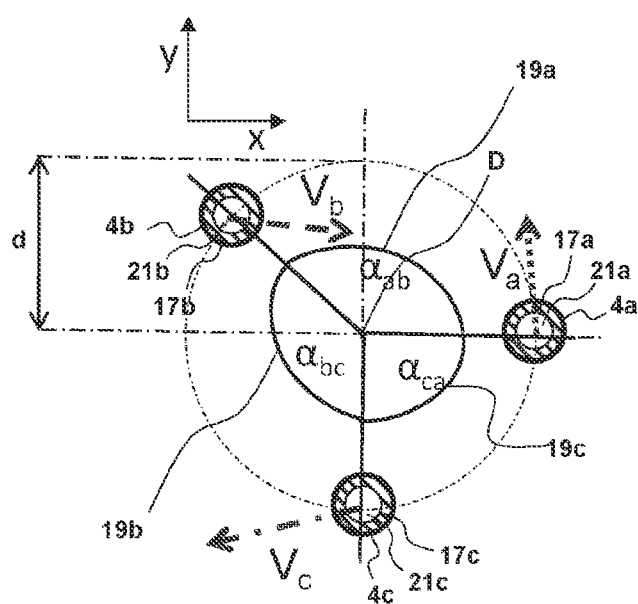
Figure 3:
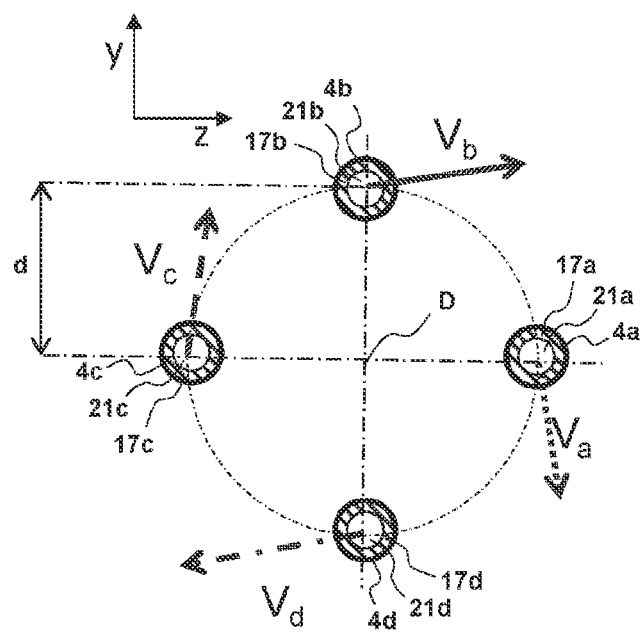
Figure 4:
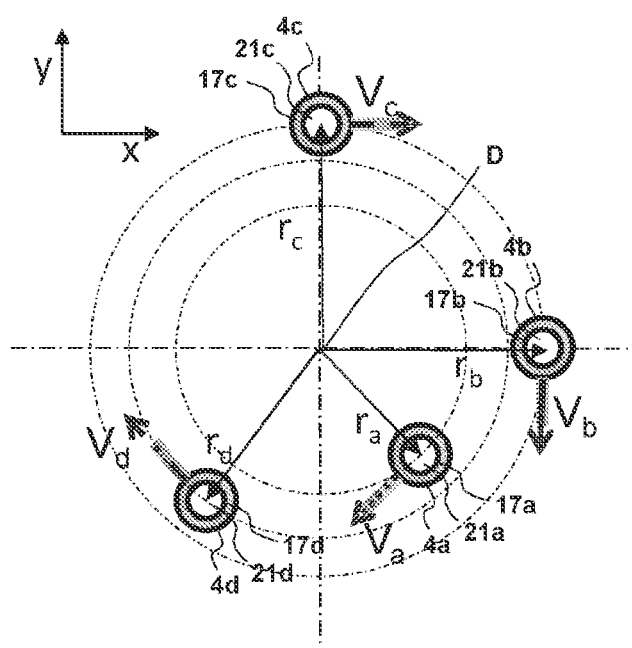
Figure 5:
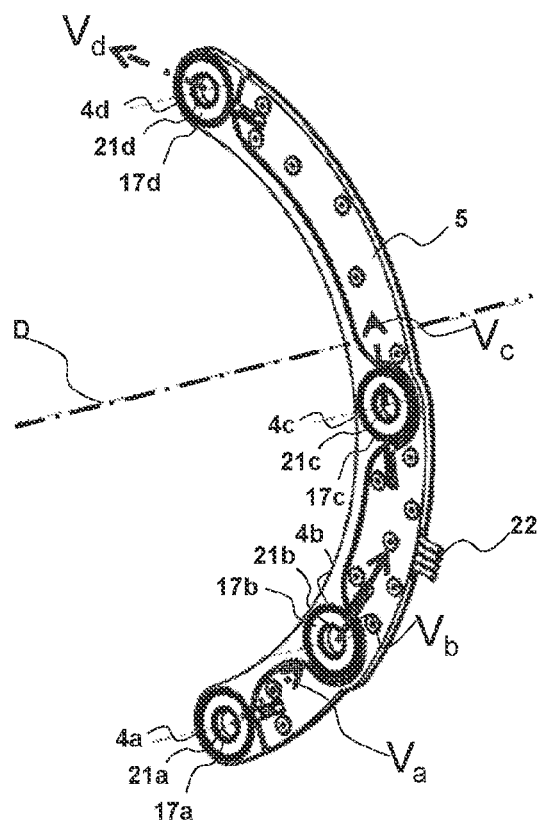
Figure 6:
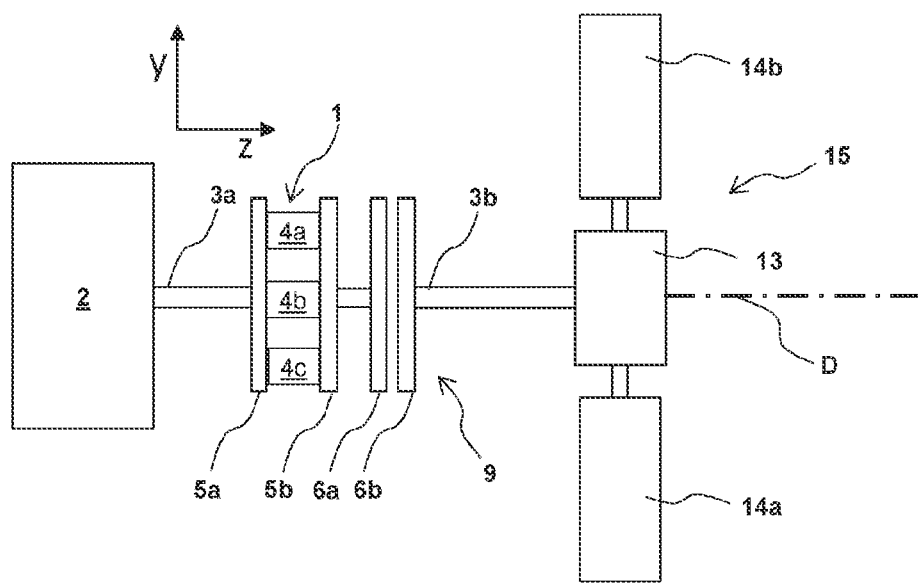
Figure 8:
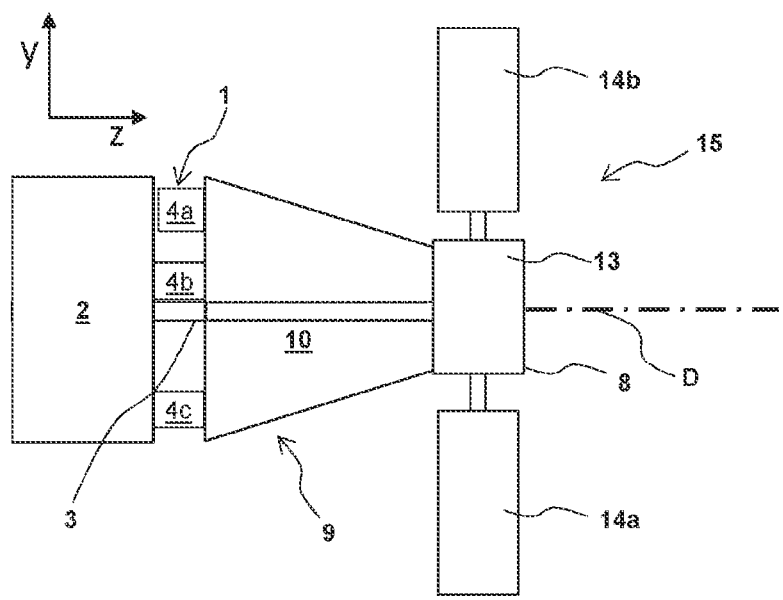
Figure 9:
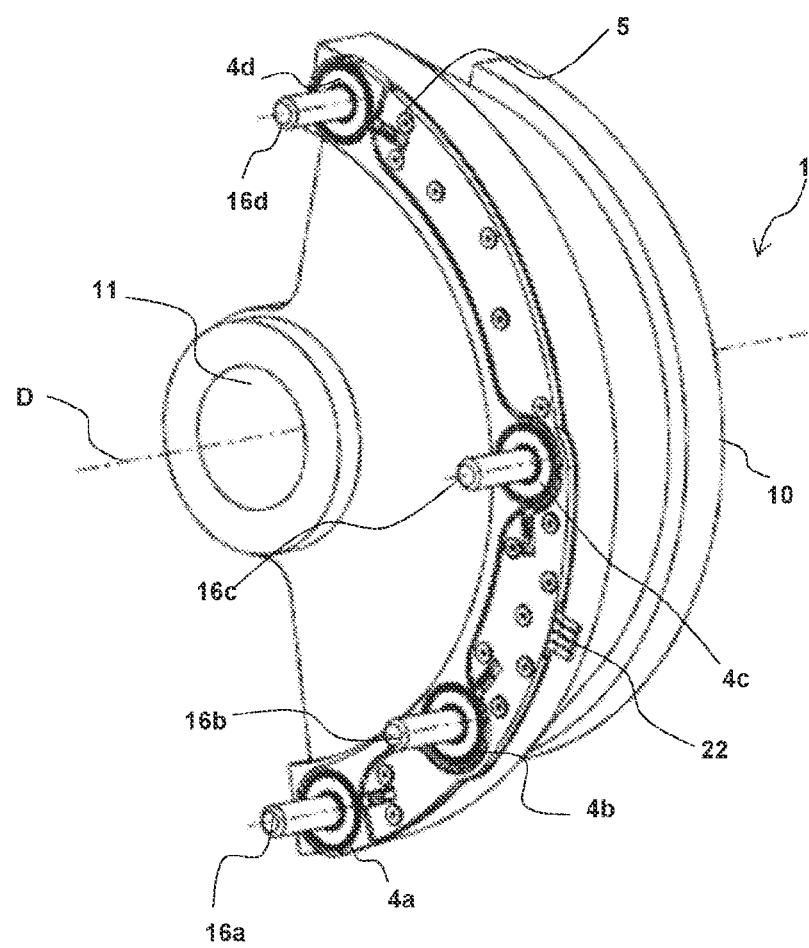
Figure 10A:
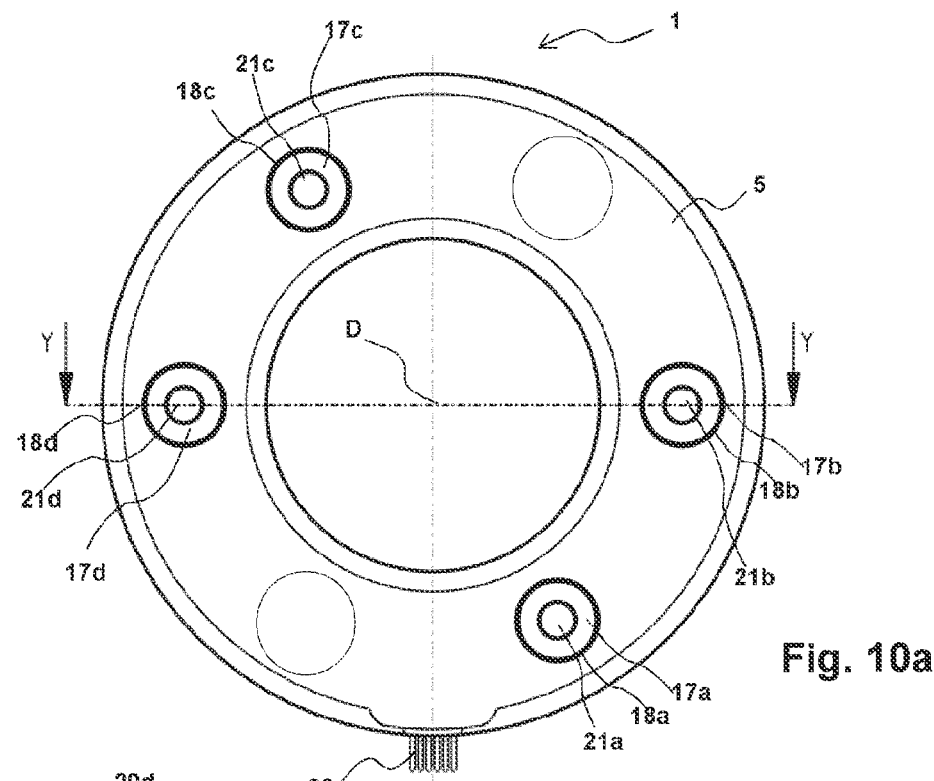
Figure 10B:
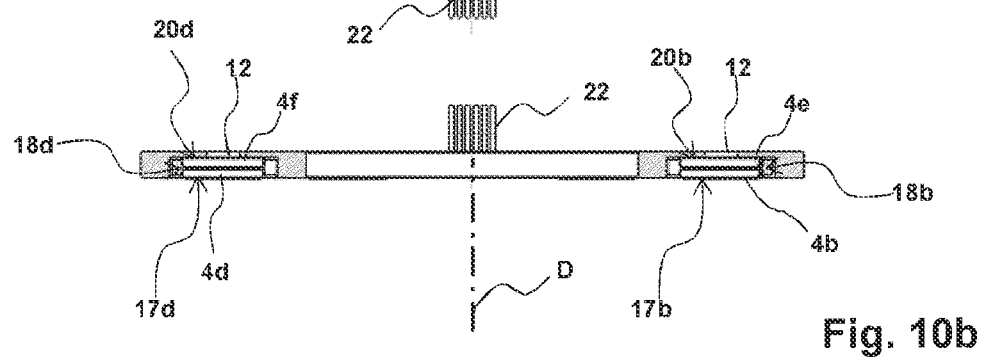
Figure 11A:
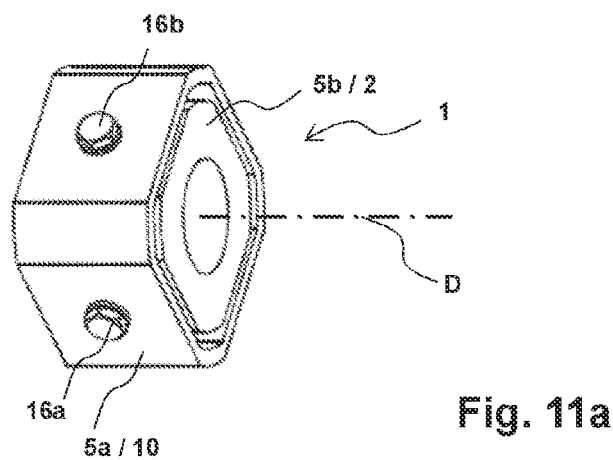
Figure 11B:
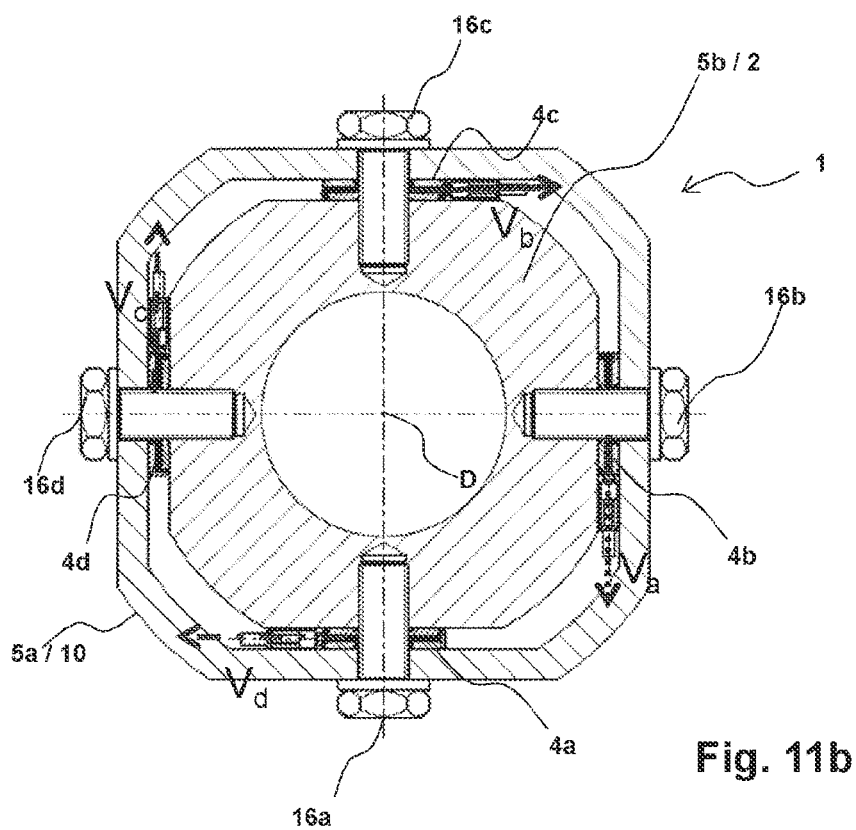
Figure 12:
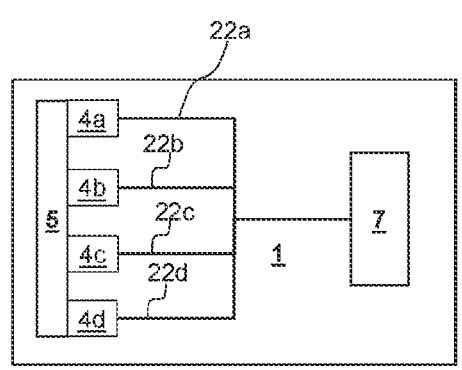

Further advantages and features will become apparent from the preferential exemplary embodiments described below with reference to the figures. The figures show, at least partially schematically:

FIG. 1 a first exemplary embodiment of a measuring arrangement for determining a force and/or a torque on a torque-transmitting shaft;

FIG. 2 an arrangement of piezoelements of a first exemplary embodiment of a measuring system;

FIG. 3 an arrangement of piezoelements of a second exemplary embodiment of a measuring system;

FIG. 4 an arrangement of piezoelements of a third exemplary embodiment of a measuring system;

FIG. 5 a perspective view of a fourth exemplary embodiment of a measuring system;

FIG. 6 a second exemplary embodiment of a measuring arrangement;

FIG. 8 a fourth exemplary embodiment of a measuring arrangement;

FIG. 9 a perspective view of a detail of a measuring arrangement with a measuring apparatus as per the fourth exemplary embodiment according to FIG. 8;

FIG. 10a a plan view and a cross-sectional view of a fifth exemplary and 10b embodiment of a measuring system;

FIG. 11a a perspective view and a cross-sectional view of a sixth exemplary and 11b embodiment of a measuring system; and FIG. 12 a circuit diagram of a measuring system corresponding to all the exemplary embodiments.

FIG. 1 shows a plan view of a first exemplary embodiment of a measuring arrangement 9 for determining a force and/or a torque on a torque-transmitting shaft 3a, 3b on a drive test bench 15. The shaft 3a, 3b thereby connects a motor 2, which among other things serves as a bearing apparatus for the shaft 3a, 3b, to a gearbox and differential 13, which is in turn connected to wheel dynamometers 14a, 14b via axle sections.

A measuring system 1 having a measuring flange 5a, 5b consisting of two parts is arranged as a fixing device between a first section 3a of the shaft and a second section 3b of the shaft. The first section 3a of the shaft is non-rotatably connected to a first part 5a of the measuring flange and the second section 3b of the shaft is non-rotatably connected to a second part 5b of the measuring flange. Three piezoelements 4a, 4b, 4c are arranged between the two parts 5a, 5b of the measuring flange and likewise fixedly attached to the parts 5a, 5b of the measuring flange, in particular by means of a non-positive connection.

With this measuring arrangement 9, a force can flow from a supporting apparatus 10 (not depicted) via the motor 2, the first section of the shaft 3a, the first part 5a of the measuring flange, the three piezoelements 4a, 4b, 4c, the second part 5b of the measuring flange and the second section 3b of the shaft, the gearbox and differential 13 and the axle components to the wheel dynamometers 14a, 14b, themselves in turn supported by suitable means. A potential power flow thereby runs from the motor 2 to the wheel dynamometers 14a, 14b via the shaft 3a, 3b and the measuring flange 5a, 5b as well as the gearbox and differential 13.

An applied force is introduced into the piezoelements or respectively applied to the piezoelements 4a, 4b, 4c, in particular by way of end faces of the piezoelements 4a, 4b, 4c, via the components of the measuring flange 5a, 5b. The measuring system 1 is shown in FIG. 1 in a plan view of a plane spanned by the y-axis and the z-axis of a depicted reference system.

FIG. 2 shows an arrangement of piezoelements 4a, 4b, 4c of a first exemplary embodiment of a measuring system 1 as can be used for example in the first exemplary embodiment of a measuring arrangement 9 according to FIG. 1.

The arrangement of the piezoelements 4a, 4b, 4c is thereby shown in a plane spanned by the y-axis and the x-axis of the reference system according to FIG. 1. The end faces 17a, 17b, 17c of the piezoelements are therefore visible.

The center points of the piezoelements 4a, 4b, 4c are all arranged at a distance d from the center point through which the rotational axis D of a shaft 3 (not depicted) runs. Each of the piezoelements 4a, 4b, 4c thereby occupies a different position about the rotational axis D or the center point respectively. The dash/dotted circle encircles the shaft, or center point respectively, and indicates the rotational direction of the piezoelements 4a, 4b, 4c at each point about the rotational axis D, or center point respectively, upon rotation of the shaft 3 (not depicted).

Each of the piezoelements 4a, 4b, 4c, exhibit a different preferred direction $V_a$, $V_b$, $V_c$ in a plane spanned by the x-axis and the y-axis. Preferably, the three preferred directions $V_a$, $V_b$, $V_c$ point in different directions and are thus oriented neither parallel nor antiparallel. Further preferably, however, only two of the three preferred directions $V_a$, $V_b$ are oriented neither parallel nor antiparallel. The third preferred direction $V_c$ can in this case be oriented parallel to one of the two other preferred directions $V_a$, $V_b$.

Angular sectors 19a, 19b, 19c in relation to rotational axis D span between the positions of the individual piezoelements 4a, 4b, 4c. Angular sector 19a between a first piezoelement 4a and a second piezoelement 4b thereby exhibits angle $\alpha_{ab}$, angular sector 19b between the second piezoelement 4b and a third piezoelement 4c exhibits angle $\alpha_{bc}$, and angular sector 19c between the third piezoelement 4c and the first piezoelement 4a exhibits angle $\alpha_{ca}$.

Preferably, at least two of the angles $\alpha_{ab}$, $\alpha_{bc}$, $\alpha_{ca}$ of the angular sectors have different values.

All of the piezoelements 4a, 4b, 4c have a bore 21a, 21b, 21c through which a fixing means, in particular a bolt or a screw (not depicted), can be guided. A shear force can be introduced via the end faces 17a, 17b, 17c.

FIG. 3 shows an arrangement of piezoelements 4a, 4b, 4c of a second exemplary embodiment of a measuring system 1.

As in FIG. 2, the piezoelements are depicted in a plan view onto the end faces 17a, 17b, 17c, 17d. The viewing direction in FIG. 3 is likewise perpendicular to the plane spanned by the x-axis and the y-axis of the reference system ($\alpha_{ab}$, $\alpha_{bc}$, $\alpha_{ca}$) and the arrangement according to FIG. 2 can also be used in a measuring arrangement 9 of FIG. 1.

The preferred directions $V_a$, $V_b$, $V_c$, $V_d$ of the individual piezoelements 4a, 4b, 4c, 4d point in different directions in the arrangement of piezoelements 4a, 4b, 4c, 4d and are not tangential to the direction of rotation, indicated by the dashed circle, yet also lie, as in FIG. 2, in a plane spanned by the x-axis and the y-axis of the reference system and thus perpendicular to a shaft 3 (not depicted), the rotational axis D of which runs through the center point out of the image plane.

The preferred direction $V_b$ of the second piezoelement 4b is oriented antiparallel to the preferred direction $V_d$ of the fourth piezoelement 4d in the depicted arrangement.

As in FIG. 2, all of the piezoelements 4a, 4b, 4c, 4d have a bore 21a, 21b, 21c, 21d through which a fixing means, in particular a bolt or a screw (not depicted), can be guided. A shear force can be introduced via the end faces 17a, 17b, 17c, 17d.

FIG. 4 shows a third arrangement of four piezoelements 4a, 4b, 4c, 4d for a third exemplary embodiment of a measuring system, as can likewise be used in a measuring arrangement 9 according to FIG. 1.

In contrast to the arrangements of FIGS. 2 and 3, the piezoelements 4a, 4b, 4c, 4d are at different distances $R_a$, $R_b$, $R_c$, $R_d$ from the center point D of the arrangement through which the shaft 3 (not depicted) would run in a measuring system. Rotational direction of the piezoelements 4a, 4b, 4c, 4d about rotational axis D, or the center point respectively, is again indicated by dashed/dotted circles.

The preferred directions $V_a$, $V_b$, $V_c$, $V_d$ of the piezoelements 4a, 4b, 4c, 4d respectively run tangential to the direction of rotation.

In contrast to FIG. 3, the piezoelements 4a, 4b, 4c, 4d are furthermore unevenly arranged over the circumference around the rotational axis D, or the center point respectively.

FIG. 5 shows a further arrangement of sensors of a fourth exemplary embodiment of the measuring system 1.

In the depicted measuring system 1, the individual piezoelements 4a, 4b, 4c, 4d are supported by a fixing device 5. The preferred directions $V_a$, $V_b$, $V_c$, $V_d$ of the piezoelements 4a, 4b, 4c, 4d are preferably oriented to the course of the fixing device 5, although can also point in other directions as long as each of the preferred directions $V_a$, $V_b$, $V_c$, $V_d$ lies parallel to or in a single plane, in particular that plane which is also defined by the fixing device 5.

The rotational axis D of a shaft 3 (not depicted) to which a force and/or torque is applied (not depicted) is arranged in this exemplary embodiment in an area to the left of the fixing device 5 in relation to FIG. 5. The dashed/dotted line indicates one such possible rotational axis D.

The rotational axis D does not thereby have to be arranged at the same distance from each of the piezoelements 4a, 4b, 4c, 4d, nor does the rotational axis D have to run through a center point defined as applicable by the curvature of the fixing device 5.

FIG. 6 shows a second exemplary embodiment of a measuring arrangement 9 on a test bench 15.

Differing from the measuring arrangement 9 according to FIG. 1, the measuring arrangement 9 of FIG. 6 further comprises a coupling 6a, 6b. A first coupling part 6a is thereby non-rotatably connected to the second part 5b of the measuring flange and can be releasably brought into non-positive contact with a second coupling part 6b.

Depending on the position of the coupling plates 6a, 6b relative to one another and the outputs to be transmitted in the force flow from the motor 2 to the wheel dynamometers 14a, 14b, a torque to be determined is applied to the measuring flange 5a, 5b.

Figure 7:
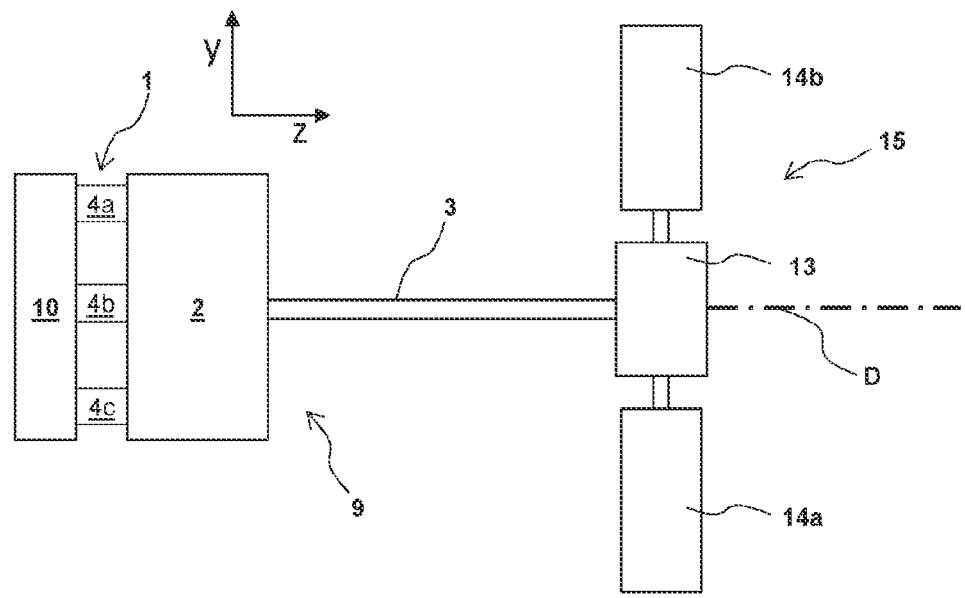

FIG. 7 shows a third exemplary embodiment of a measuring arrangement 9 on a test bench 15.

Unlike with the measuring arrangement 9 according to FIGS. 1 and 6, force and/or torque is not measured in the power flow between the motor 2 and the wheel dynamometers 14a, 14b, or between the motor 2 and the gearbox and differential 13 respectively. Instead, the torque and/or forces acting on the torque-transmitting shaft 3 are determined outside of the power flow via the reactive forces with which the motor 2 is supported on the test bench by a supporting apparatus 10.

The piezoelements are accordingly arranged in the flow of force between the supporting apparatus 10 and the motor 2.

As in the other exemplary embodiments having a measuring flange 5a, 5b in the shaft 3, a torque-transmitting connection is also established here between the piezoelements 4a, 4b, 4c and the motor 2 as well as the supporting apparatus 10 by the piezoelements 4a, 4b, 4c, or their end faces respectively, forming a non-positive connection with corresponding sections of the motor 2 and the supporting apparatus 10.

FIG. 8 shows a fourth exemplary embodiment of a measuring arrangement 9 which can in particular be used in a vehicle.

In contrast to the exemplary embodiment according to FIG. 7, the supporting apparatus 10 in this exemplary embodiment is designed as a type of bell housing. The motor 2 is therefore supported on a housing 8 of the gearbox and differential 13.

The flow of force in this exemplary embodiment thus runs from the gearbox housing 13 via the bell housing 10 to the motor 2 and from there via the torque-transmitting shaft and the gearbox and differential 13 to the wheel dynamometers 14a, 14b.

The piezoelements 4a, 4b, 4c here are also arranged outside of the power flow between the motor 2 and the bell housing 10 in order to transmit a reactive force and/or torque. Here as well, a non-positive connection is formed between the corresponding surfaces of the motor 2 and bell housing 10 and the piezoelements 4a, 4b, 4c.

Preferably, each of the arrangements of piezoelements 4a, 4b, 4c, 4d of the different exemplary embodiments of a measuring system 1 shown in FIGS. 2 to 5 can be used in the exemplary embodiments for measuring arrangements 9 shown in FIGS. 6 to 8.

As an example, FIG. 9 shows the use of a measuring system according to FIG. 5 in the fourth exemplary embodiment of a measuring arrangement 9 according to FIG. 8. The measuring system 1 with the fixing device 5 and piezoelements 4a, 4b, 4c, 4d is arranged on a bell housing 10 in this plan view.

Preferably, the measuring system 1 is thereby supported on the bell housing 10 by fixing means 16a, 16b, 16c, 16d. Moreover, the fixing means 16a, 16b, 16c, 16d serve to produce a pretensioning between the motor 2 (not shown) and the bell housing 10 so that the respective end faces of the piezoelements 4a, 4b, 4c, 4d come into contact with a surface of the bell housing 10 and a surface of the motor 2 to form a non-positive connection.

Due to the friction between the piezoelements $4a$, $4b$, $4c$, $4d$ and the motor 2 and supporting apparatus 10, shear forces can be introduced to the piezoelements via the end faces of said piezoelements which effect a separation of charge in the piezoelements $4a$, $4b$, $4c$, $4d$. As a result, there are shear force-dependent potentials on the charge dissipators or electrical lines 22 respectively.

A shaft 3 (not depicted) can extend through the bell housing 10 in the direction of the gearbox and the differential 13 through an opening 11 in said bell housing 10.

FIGS. $10a$ and $10b$ show a fifth exemplary embodiment of a measuring system 1 having piezoelement pairs $18a$, $18b$, $18c$, $18d$ supported by a fixing device 5.

FIG. $10a$ thereby shows a plan view onto the measuring system 1 and FIG. $10b$ shows a cross-sectional view along line Y-Y. The piezoelement pairs $18a$, $18b$, $18c$, $18d$ are in each case formed by two piezoelements $4b$, $4e$; $4d$, $4f$ arranged adjacent one another in the direction of the rotational axis D of a torque-transmitting shaft 3 (not shown), the applied force and/or applied torque of which are to be determined.

A first piezoelement $4b$, $4d$ of each piezoelement pair $18a$, $18b$, $18c$, $18d$ thereby exhibits a preferred direction which is parallel to or in a single plane intersected by the rotational axis D of the shaft 3, wherein the plane is preferably oriented perpendicular to the rotational axis D, as depicted in FIG. $10b$. Preferably forces and/or torque acting in this plane can be determined by means of these first sensors $4b$, $4d$.

The further piezoelements $4e$, $4f$ of the piezoelement pairs $18a$, $18b$, $18c$, $18d$ preferably exhibit preferred directions which are not parallel to the plane and are further preferably perpendicular to said plane. Preferably compressive or tensile forces which are oriented substantially perpendicular to the direction of rotation D can therefore be measured with the further piezoelements $4e$, $4f$.

As depicted in FIG. $10b$, each piezoelement pair has two end faces $17b$, $20b$; $17d$, $20d$ respectively formed by one of the piezoelements $4b$, $4e$; $4d$, $4f$.

The one end face $20b$, $20d$ in each case is as a result seated in the fixing device 5. The other end face $17b$, $17d$ can come into contact with a component in respect of which a force is to be measured. Both end faces $17b$, $17d$ as well as second end faces $20b$, $20d$ thereby form a preferably non-positive, in particular frictional, connection with the fixing device and the other component.

As previously described, fixing means, in particular tensioning screws, can to that end be guided into the bores in the piezoelements through bores $21a$, $21b$, $21c$, $21d$ in the piezoelement pairs $18a$, $18b$, $18c$, $18d$, by means of which the fixing device and the respective other component and thereby also the piezoelement pairs $18a$, $18b$, $18c$, $18d$ can be braced. Preferably, fixing device 5 as well exhibits cavities 12 in order to accommodate the fixing means.

Each of the piezoelements $4a$, $4b$, $4c$, $4d$, $4e$, $4f$ generates a measurement signal S1, S2, S3, S4, S5, S6 able to be picked up via charge dissapators 22.

FIGS. $11a$ and $11b$ show a sixth exemplary embodiment of an inventive measuring system 1. FIG. $11a$ is thereby a perspective plan view and FIG. $11b$ a cross-sectional view.

The measuring system 1 in this exemplary embodiment is characterized in that the piezoelements $4a$, $4b$, $4c$, $4d$ are arranged between a first part of the flange $5a$ and a second part of the measuring flange $5b$, wherein a pretensioning is applied in the radial direction to the rotational axis D. This is in contrast to the exemplary embodiments of FIGS. 1 to 5 and $10a$/$10b$ where the pretensioning and consequently the frictional connection is generated in the direction of rotational axis D.

Each of the piezoelements $4a$, $4b$, $4c$, $4d$ generates a measurement signal S1, S2, S3, S4 able to be picked up via charge dissipators.

Alternatively to a measuring flange $5a$, $5b$, the depicted components respectively connected to the piezoelements $4a$, $4b$, $4c$, $4d$ can also be a bearing apparatus 2 and a supporting apparatus 10 of a shaft 3 (not depicted).

As shown in FIG. 12, a measuring system 1 preferably comprises a signal processing device 7 for processing measurement signals S1 of the first piezoelement $4a$, measurement signals S2 of the second piezoelement $4b$, measurement signals S3 of the third piezoelement $4c$ and measurement signals S4 of the fourth piezoelement $4d$.

In order to be able to calculate the torque Mz on the shaft as well as transverse forces Fx, Fy, the signal processing device 7 preferably renders an orthogonal decomposition of the respective preferred direction $V_a$, $V_b$, $V_c$, $V_d$ of the piezoelements $4a$, $4b$, $4c$, $4d$, the measurement signals S1, S2, S3, S4 and/or the measured forces.

The parameters Mz, Fx, Fy to be determined are thereby the solution to a system of equations, wherein an equation as follows applies to each measurement signal:

$$S1 = a_{11} \cdot Mz + a_{12} \cdot Fx + a_{13} \cdot Fy$$
$$S2 = a_{21} \cdot Mz + a_{22} \cdot Fx + a_{13} \cdot Fy$$
$$S3 = a_{31} \cdot Mz + a_{32} \cdot Fx + a_{23} \cdot Fy$$
$$\vdots$$
$$SN = a_{N1} \cdot Mz$$

Each coefficient a thereby depends on multiple factors such as, for example, the respective position of the sensor and the orientation of the preferred direction $V_a$, $V_b$, $V_c$, $V_d$ in the reference system, a sensitivity of the respective piezoelement $4a$, $4b$, $4c$, $4d$, and a potential signal loss due to a force shunt from fixing means.

Solving such a system of equations for the torque component Mz, a first transverse force component Fx and a second transverse force component Fy requires measurement signals from at least three piezoelements $4a$, $4b$, $4c$, with preferred directions $V_a$, $V_b$, $V_c$ oriented so as to lie in a single plane. Moreover, at least two of the preferred directions $V_a$, $V_b$, $V_c$ may not be in either parallel or antiparallel orientation.

For this general case described by N=3; i.e. with three piezoelements $4a$, $4b$, $4c$, the solution to the above-depicted system of equations is unique. Should further piezoelements be added to the measuring system 1, the system of equations having three parameters Mz, Fx, Fy to be determined is overdetermined, although the measuring accuracy can be further improved.

In the case of N=4, four different systems of equations F (S1, S2, S3), F (S1, S2, S4), F (S1, S3, S4), F (S2, S3, S4) can be established. The values determined for the individual parameters Mz, Fx, Fy to be determined can then be totaled and averaged; i.e. divided by four in the case of four piezoelements $4a$, $4b$, $4c$, $4d$. Similarly, an overdetermined system of equations F (S1, S2, . . . , SN), which is solved by means of a minimization task, can be established.

If a general solution to the system of equations has been found, calculation of the components Fx, Fy, Mz to be determined can be reduced to matrix multiplication. Same has three rows and as many columns as available measuring signals S1, S2, S3, . . . SN. The matrix elements or coefficients respectively represent the respective contributions of the individual sensors to the parameters Fx, Fy, Mz to be determined.

$$\begin{pmatrix} Fx \\ Fy \\ Mz \end{pmatrix} = \begin{pmatrix} c11 & c12 & c13 & c14 \\ c21 & c22 & c23 & c24 \\ c31 & c32 & c33 & c34 \end{pmatrix} \begin{pmatrix} s1 \\ s2 \\ s3 \\ s4 \end{pmatrix}$$

Decomposing the measurement signals S1, S2, S3, S4 into components contributing to the respective parameters Mz, Fx, Fy to be determined requires knowing the position of the piezoelements 4a, 4b, 4c and the orientation of the preferred directions $V_a$, $V_b$, $V_c$, $V_d$.

The geometric parameters can be determined either from a design drawing of a measuring system 1 or from knowledge of the preferred directions of the piezoelements 4a, 4b, 4d.

The orientation of preferred directions $V_a$, $V_b$, $V_c$, $V_d$ of piezoelements 4a, 4b, 4c, 4d can however also be determined by determining the preferred directions $V_a$, $V_b$, $V_c$, $V_d$ by way of calibration measurement. Preferably, the measuring system 1 is to that end fixed between two flat plates. In a next step, external transverse forces with a known direction are applied. The preferred direction $V_a$, $V_b$, $V_c$, $V_d$ of piezoelements 4a, 4b, 4c, 4d in the plane spanned by the preferred direction $V_a$, $V_b$, $V_c$, $V_d$ of the piezoelements 4a, 4b, 4c, 4d can be determined from the magnitude of the individual measurement signals S1, S2, S3, S4 relative to the magnitude and direction of the transverse forces introduced.

Similarly, by applying a defined torque Mz and measuring the individual measurement signals S1, S2, S3, S4, a respective distance $r_a$, $r_b$, $r_c$, $r_d$ of the piezoelements 4a, 4b, 4c, 4d from a rotational axis D can be determined when the preferred directions $V_a$, $V_b$, $V_c$, $V_d$ of the individual piezoelements 4a, 4b, 4c, 4d are known.

The described exemplary embodiments are merely examples which are in no way to be limiting of protective scope, application and configuration. Rather, the preceding description affords one skilled in the art a guideline for the implementation of at least one exemplary embodiment, whereby various modifications can be made, in particular with regard to the function and arrangement of the described components, without departing from the protective scope as results from the claims and equivalent combinations of features. In particular, individual exemplary embodiments can be combined with each other.

LIST OF REFERENCE NUMERALS measuring system 1
bearing apparatus/motor 2
shaft 3
piezoelement 4a, 4b, 4c, 4d, 4e, 4f
fixing device 5, 5a, 5b, 5c, 5d
coupling 6a, 6b
signal processing device 7
housing 8
measuring arrangement 9
supporting apparatus 10
opening 11
cavity 12
gearbox and differential 13
wheel dynamometer 14a, 14b
test bench 15
fixing means 16a, 16b, 16c, 16d
first end face 17a, 17b, 17c, 17d
piezoelement pair 18a, 18b
angular sector 19a, 19b, 19c
second end face 20b, 20d
bore 21a, 21b, 21c, 21d
charge dissipator/electrical line 22, 22a, 22b, 22c, 22d
preferred direction $V_a$, $V_b$, $V_c$, $V_d$
measurement signal S1, S2, S3, S4
rotational axis D

The invention claimed is:

1. A measuring system for determining a force and a torque on a torque-transmitting shaft, wherein the measuring system comprises:
at least three piezoelements, each of the at least three piezoelements having a piezoelectric crystal oriented in a preferred direction, wherein each of the at least three piezoelements are arranged at different positions about a rotational axis of the torque-transmitting shaft in a force flow transmitted via the torque-transmitting shaft such that a force of the force flow acts on the at least three piezoelements, wherein each of the preferred directions of the piezoelectric crystals lie parallel to a single plane intersected by the rotational axis or in the single plane intersected by the rotational axis, and wherein the preferred directions of the piezoelectric crystals are oriented neither parallel nor antiparallel to one another; and
a signal processing device which is configured to determine the force and the torque using a system of equations for force components and torque components based on measurement signals of individual piezoelements of the at least three piezoelements, wherein measurement signals from all of the piezoelements that have a piezoelectric crystal oriented in a respective preferred direction lying parallel to the single plane intersected by the rotational axis or in the single plane intersected by the rotational axis are used to determine each of the force components and each of the torque components, wherein the systems of equations is:

$S1 = a_{11} \cdot Mz + a_{12} \cdot Fx + a_{13} \cdot Fy$ $S2 = a_{21} \cdot Mz + a_{22} \cdot Fx + a_{23} \cdot Fy$ $S3 = a_{31} \cdot Mz + a_{32} \cdot Fx + a_{33} \cdot Fy$ $SN = a_{N1} \cdot Mz$ and wherein S1-SN are the measurement signals, Mz represents a torque component, Fx represents a first force component, and Fy represents a second force component.

2. The measuring system according to claim 1, wherein the at least three piezoelements are geometrically arranged such that there is no mirror axis or no point of symmetry in terms of their respective position relative one another in a projection onto the single plane intersected by the rotational axis.

3. The measuring system according to claim 1, wherein the at least three piezoelements are geometrically arranged such that at least two piezoelements of the at least three piezoelements have a different radial distance from the rotational axis or that two circular sectors around the rotational axis span a different angle between two respective piezoelements of the at least three piezoelements.

4. The measuring system according to claim 1, wherein the signal processing device is further configured to decompose the measurement signals into components contributing to the force or the torque to be determined.

5. The measuring system according to claim 1, wherein the signal processing device is further configured to account for a contribution of individual piezoelements of the at least three piezoelements to different force components and torque components.

6. The measuring system according to claim 1, wherein the single plane intersected by the rotational axis is oriented at least substantially perpendicular to the rotational axis of the torque-transmitting shaft.

7. The measuring system according to claim 1, wherein an area of the at least three piezoelements over which the force is introduced lies at least substantially parallel to the single plane intersected by the rotational axis.

8. The measuring system according to claim 1, wherein the at least three piezoelements form a main direct force relative to the force flow, and wherein a force shunt takes in less than 10% of the force of the force flow.

9. The measuring system according to claim 1, wherein a further piezoelement having a piezoelectric crystal oriented in a preferred direction that is not parallel to the single plane intersected by the rotational axis is arranged adjacent to each piezoelement of the at least three piezoelements in a direction of the rotational axis of the torque-transmitting shaft, wherein the at least three piezoelements form pairs with the respective adjacently arranged further piezoelement, wherein the force of the force flow acts on the formed pairs of piezoelements.

10. The measuring system according to claim 1, further comprising a fixing device, wherein the fixing device supports the at least three piezoelements and positions them relative to each other.

11. The measuring system according to claim 1, wherein the at least three piezoelements are unevenly distributed about the rotational axis.

12. The measuring system according to claim 9, wherein all of the at least three piezoelements and the further piezoelement or the formed pairs of piezoelements within a defined circular sector about the rotational axis are arranged at an approximate angle α of <300°.

13. The measuring system according to claim 9, wherein the torque-transmitting shaft is supported by a bearing apparatus, an output or input shaft of which is formed by the torque-transmitting shaft,
wherein a fixing device supports the at least three piezoelements and further piezoelement or the formed pairs of piezoelements within a defined circular sector about the rotational axis and the fixing device is designed such that a force is measurable between the bearing apparatus and a supporting apparatus for supporting the bearing apparatus via the at least three piezoelements and further piezoelement.

14. The measuring system according to claim 13, wherein the fixing device is further designed such that the force can be introduced parallel to end faces of the at least three piezoelements and the further piezoelement or the formed pairs of piezoelements by way of a non-positive connection.

15. The measuring system according to claim 1, being configured to measure forces acting both tangential to a rotational direction of the torque-transmitting shaft, which contribute to the torque, as well as transverse forces, which act perpendicular to the rotational direction of the torque-transmitting shaft.

16. A measuring arrangement for determining a force or a torque on a torque-transmitting shaft which comprises:
the measuring system based on the piezoelectric effect according to claim 1; and
the torque-transmitting shaft,
wherein the at least three piezoelements of the measuring system are arranged between a first part of the torque-transmitting shaft and a second part of the torque-transmitting shaft such that a force can be measured between the first part and the second part by means of the at least three piezoelements.

17. The measuring arrangement according to claim 16, wherein the torque-transmitting shaft consists of two sections able to be connected via a coupling device, wherein the measuring system determines the force or the torque on one of the two sections.

18. A measuring arrangement for determining a force or a torque on a torque-transmitting shaft which comprises:
the measuring system according to claim 1 and based on the piezoelectric effect;
the torque-transmitting shaft;
a bearing apparatus; and
a supporting apparatus of the bearing apparatus,
wherein the bearing apparatus supports the torque-transmitting shaft, and wherein the measuring system does not alter a rotating mass of the torque-transmitting shaft or a rotating mass of rotating parts of an aggregate consisting of the torque-transmitting shaft and the bearing apparatus.

19. A method for calibrating the measuring system according to claim 1, the method comprising:
applying a first defined force in a first direction parallel to the single plane;
applying a second defined force in a second direction parallel to the single plane;
detecting at least one of a first signal of a first piezoelectric sensor, a second signal of a second piezoelectric sensor, and a third signal of a third piezoelectric sensor while the first defined force and/or the second defined force is being applied; and
deriving the preferred directions of the at least three piezoelements on the basis of the detected first signal, second signal, and/or third signal, and the first and second directions of the first and second defined forces.

20. A method for calibrating the measuring system according to claim 1, the method comprising:
applying a defined torque about the rotational axis of the torque-transmitting shaft;
detecting at least one of a first signal of a first piezoelectric sensor, a second signal of a second piezoelectric sensor, and a third signal of a third piezoelectric sensor; and
deriving distances of the at least three piezoelements from the rotational axis on the basis of the detected first signal, second signal, and/or third signal, and the defined torque.

21. A method for determining a torque applied to a shaft and a force applied to the shaft by means of a measuring system comprising at least three piezoelements, each of the at least three piezoelements having a piezoelectric crystal oriented in a preferred direction, and wherein each of the at least three piezoelements are arranged at different positions about a rotational axis of the shaft in a force flow transmitted via the shaft such that a force of the force flow acts on the at least three piezoelements, wherein the preferred directions of the piezoelectric crystals are oriented neither parallel nor antiparallel to one another, wherein the torque and the force are determined by means of a system of equations for force components and torque components on the basis of measurement signals of individual piezoelements of the at least three piezoelements, wherein measurement signals from all of the piezoelements that have a piezoelectric crystal oriented in a respective preferred direction lying parallel to a single plane intersected by the rotational axis or in the single plane intersected by the rotational axis are used to determine each of the force components and each of the torque components, is:

$$S1 = a_{11} \cdot Mz + a_{12} \cdot Fx + a_{13} \cdot Fy$$

$$S2 = a_{21} \cdot Mz + a_{22} \cdot Fx + a_{23} \cdot Fy$$

$$S3 = a_{31} \cdot Mz + a_{32} \cdot Fx + a_{33} \cdot Fy$$

$$SN = a_{NI} \cdot Mz$$

and wherein S1-SN are the measurement signals, Mz represents a torque component, Fx represents a first force component, and Fy represents a second force component.

* * * * *